US006998617B2

(12) United States Patent
D'Emilio et al.

(10) Patent No.: US 6,998,617 B2
(45) Date of Patent: Feb. 14, 2006

(54) APPARATUS AND METHOD FOR DETECTING WEAPONS OF MASS DESTRUCTION

(75) Inventors: Carl D'Emilio, Long Hill Township, NJ (US); Parvez Mansuri, Old Bridge, NJ (US); Rajesh P. Kaikini, Montgomery Township, NJ (US); Joseph Saturnia, New Providence, NJ (US)

(73) Assignee: Cargo Sentry, Inc., Murray Hill, NJ (US)

( * ) Notice: Subject to any disclaimer, the term of this patent is extended or adjusted under 35 U.S.C. 154(b) by 120 days.

(21) Appl. No.: 10/458,911

(22) Filed: Jun. 11, 2003

(65) Prior Publication Data

US 2006/0006338 A1 Jan. 12, 2006

(51) Int. Cl.
*G01N 23/04* (2006.01)

(52) U.S. Cl. .............................. 250/358.1; 250/363.01

(58) Field of Classification Search ............ 250/358.1, 250/363.01, 363.02, 369, 392, 395, 336.1; 340/600, 539.13, 568.1, 539.26; 378/57, 378/62

See application file for complete search history.

(56) References Cited

U.S. PATENT DOCUMENTS

| | | | | |
|---|---|---|---|---|
| 4,430,568 | A | 2/1984 | Yoshida et al. | |
| 5,638,420 | A | 6/1997 | Armistead | |
| 5,838,759 | A | 11/1998 | Armistead | |
| 6,058,158 | A | 5/2000 | Eiler | |
| 6,088,423 | A | 7/2000 | Krug et al. | |
| 6,192,104 | B1 | 2/2001 | Adams et al. | |
| 6,249,567 | B1 | 6/2001 | Rothschild et al. | |
| 6,347,132 | B1 | 2/2002 | Annis | |
| 6,370,222 | B1 | 4/2002 | Cornick, Jr. | |
| 6,453,007 | B1 | 9/2002 | Adams et al. | |
| 6,768,421 | B1 * | 7/2004 | Alioto et al. | 340/600 |
| 6,826,452 | B1 * | 11/2004 | Holland et al. | 700/245 |
| 6,843,599 | B1 * | 1/2005 | Le et al. | 378/198 |
| 2002/0097836 | A1 | 7/2002 | Grodzins | |
| 2002/0138197 | A1 * | 9/2002 | Schramke et al. | 701/213 |
| 2003/0169853 | A1 * | 9/2003 | Moses | 379/37 |
| 2003/0201394 | A1 * | 10/2003 | Peoples | 250/336.1 |
| 2003/0227382 | A1 * | 12/2003 | Breed | 340/539.13 |
| 2004/0041706 | A1 * | 3/2004 | Stratmoen et al. | 340/539.26 |
| 2004/0073808 | A1 * | 4/2004 | Smith et al. | 713/200 |
| 2004/0113783 | A1 * | 6/2004 | Yagesh | 340/568.1 |
| 2004/0222888 | A1 * | 11/2004 | Young et al. | 340/568.1 |

* cited by examiner

*Primary Examiner*—Otilia Gabor
(74) *Attorney, Agent, or Firm*—Norris, McLaughlin & Marcus

(57) ABSTRACT

An apparatus, which may have an adjustable length, and system for detecting items, such as weapons of mass destruction, in cargo shipping containers or other types of containers. The apparatus comprises one or more detection means and can be releasably secured to a container handling means, such as a crane spreader bar, a top pick, a top handler, a transtainer and a straddle carrier, bar and/or cargo container. Data from the detection means can be transmitted to a local processing system and/or a central processing system.

21 Claims, 12 Drawing Sheets

APPARATUS AND METHOD FOR DETECTING WEAPONS OF MASS DESTRUCTION

BACKGROUND OF THE INVENTION

1. Field of the Invention

The invention concerns an apparatus, preferably an adjustable apparatus, and system for detecting items, such as weapons of mass destruction, in cargo shipping containers or other types of containers. The apparatus comprises one or more detection means, such as portable scanning devices, and may comprise one or more optical character recognition means. The apparatus can be releasably secured to container handling means, such as a crane spreader bar, top pick, top handler, transtainer, straddle carrier and the like. The apparatus can be adapted to different size container handling means and containers throughout the world. Data from the detection means and optical character recognition means can be transmitted to a local processing system, and the data can then be transmitted to a central processing system.

2. The Prior Art

The shipping industry is considered a risk for terrorist activity, including the smuggling of weapons of mass destruction into a sovereign territory. The high volume of cargo makes it virtually impossible for the shipping industry to physically inspect the contents of every container entering the countries likely to be the target of a terrorist attack. For example, each year there are over 22,000 vessels calling on the United States. On an average, a vessel can discharge from 500–2000 containers at a single call. Cargo containers also enter the United States via intermodal transportation on trains from Canada and Mexico. It is estimated that, currently, less than 2% of all containers entering the United States are inspected.

The containerized shipping industry is particularly susceptible. The task of properly screening containerized cargo is compounded by the process of loading and unloading the cargo container. Unlike bulk shipping, in which cargo is loaded directly on to the transportation vehicle, containerized shipping involves the release of empty containers to shippers for loading at their premises. The container is then returned by an independent carrier, and consigned to the shipping carrier only just before it is loaded onto the transportation means, most likely a ship (vessel) or train. Given the current process, there is no feasible way to confirm that the contents declared in the container's manifest are the only items stowed in the container.

Current transportation systems have evolved to a level of sophistication that involves reliance on ocean carriers to provide "just in time" delivery for product sale. This dependency on the container industry magnifies the security risks in that the movement of each container cannot be delayed long enough to provide physical inspections of each container. Such delays would create a tremendous burden on the economy that would be felt worldwide.

Conventional scanning apparatus and systems for cargo containers include container based scanning, computer assisted scanning at the point of discharge, cargo scanning at the point of loading and X-ray scanning. Examples are disclosed in U.S. Pat. No. 6,058,158 that describes a vehicle capable of traveling along a parked container having an X-ray device to check the contents of cargo containers, and U.S. Pat. No. 5,838,759 that describes a combination of X-ray imaging and photoneutron probing to detect contraband and describes moving cargo containers past the detection equipment or using a straddle car to move the detection equipment around the container. U.S. Pat. No. 6,370,222 describes a verification system wherein an image of the contents of a cargo container is obtained, preferably a backscatter X-ray image, which is then stored in a computer data base for retrieval and comparison to a later image of the cargo container. Each of these has several drawbacks including cost and time factors, and may not provide detection of weapons of mass destruction prior to the weapon reaching the sovereign territory of the nation subject to attack.

Conventional hand-held scanners and drive-through portals impede the continuous flow of containers. Hand-held scanning requires that the containers be set aside for lengthy inspections and portals require that the containers be driven through the portal at relatively slow rates, such as three minutes per container, which is slow enough to impede the normal flow of a container terminal, considering the industry standard of about 45 to 90 seconds to load a container. Also, the high cost of conventional portal based solutions limits the economic feasibility of installing conventional technology at each entry lane for a terminal and limited availability of detection equipment can cause further congestion and delay in loading and unloading operations.

We have developed an apparatus and system for detecting items, such as weapons of mass destruction, in cargo containers, that is not encumbered by drawbacks associated with known apparatus and systems. The preferred invention involves the use of an adjustable apparatus universally adaptable to all sizes of container handling means that comprises one or more detecting means, preferably for detecting weapons of mass destruction, e.g. nuclear, biological or chemical weapons and, optionally, optical character recognition means. The apparatus is removeably secured to the container handling means and the detection means is used to analyze whether the contents of the cargo container includes weapons of mass destruction. The data is transmitted to a local processing system and may be incorporated into a shipping manifest for the cargo container. The data and/or manifest may then be transmitted to central processing unit prior to the cargo container reaching the sovereign territory of the point of destination.

The container handling means based detection device of the invention utilizes the existing loading step in the container movement cycle to scan the cargo container for weapons. Every cargo container must be loaded into a transportation means via the container handling means. By deploying the detection technology at this step in the supply chain, the flow of the cargo container is not impeded in any way. Scanning cargo containers in this manner will provide coverage for nearly all, if not 100%, of cargo containers loaded onto a transportation vehicle. Also, a container handling means based detection device provides a deployment mechanism that can travel with the transportation vehicle and can be attached to the container handling means during the loading process at any part of the world, which is particularly beneficial in the containerized shipping industry. This matching of the technology with the vessel reduces the financial investment by the industry and reduces maintenance requirements because the inventory of detection equipment is greatly reduced.

SUMMARY OF THE INVENTION

The invention concerns an apparatus and system for detecting items, such as weapons of mass destruction, in cargo containers or other shipping containers. Weapons of mass destruction include nuclear, biological and chemical weapons. The apparatus preferably comprises one or more members that are adjustable, and one or more detection means. Because the apparatus is generally adjustable it can be used universally at almost any port of call or loading point (e.g. rail yard) regardless of the size and type of loading device, container handling means or size of the cargo container. The apparatus can be of fixed size corresponding to common sized cargo containers, like any ISO container. In an embodiment of the invention, however, the apparatus is adjustable and can be adjusted to fit the length of any common sized cargo container, such as the length of any standard ISO container. The invention encompasses an apparatus capable of being releaseably secured between a cargo container and container handling means wherein the apparatus comprises one or more detection devices.

The apparatus is releaseably secured to the container handling means and/or the cargo container or other containers. When each container is loaded, the detection means is used to detect items, including weapons of mass destruction, such as nuclear, biological and chemical weapons, and the data is transmitted from the detection means to a local processing system, generally on the transportation means or near the point where the cargo is loaded onto the transportation means. The apparatus may also be equipped with one or more optical character recognition means to record the container number, and an alarm if the conditions for weapons of mass destruction are detected. The data may be compiled into the shipping manifest for the cargo container. The data from the detection means, optical character recognition means and/or shipping manifest may be transmitted to authorities in sovereign nation where the containers are scheduled for delivery, or its appointed representatives, prior to cargo reaching the point of destination and/or entering the sovereign territory, or may be used for cargo containers loaded and traveling within a sovereign territory.

DETAILED DESCRIPTION OF THE DRAWINGS

DETAILED DESCRIPTION OF THE INVENTION

Figure 1:
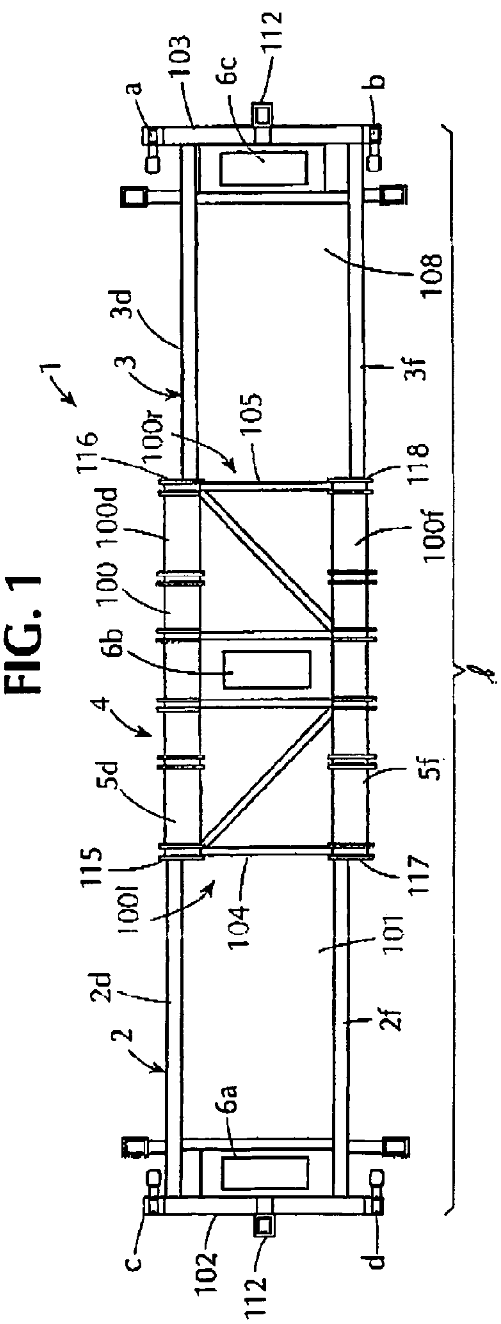
FIG. 1 is a top view of the apparatus in accordance with an embodiment of the invention.
Figure 2:
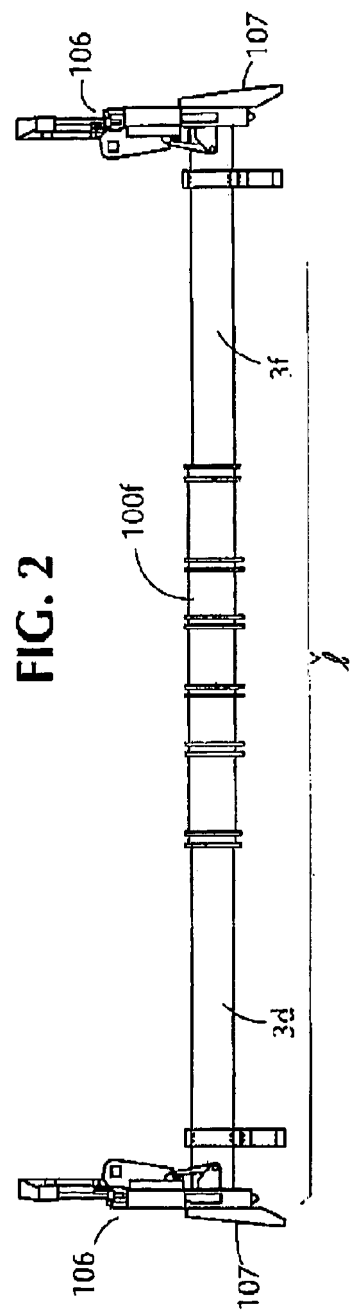
FIG. 2 is a side view of the apparatus in accordance with an embodiment of the invention.

In the embodiment of the invention shown in figures, particularly FIGS. 1 and 2, the apparatus 1 comprises a first member 2, a second member 3 and a midsection 100. The first member 2, second member 3 and midsection 100 may be separate structures or may, be components of one structure. In any event, the preferred apparatus 1 comprises a means for adjusting the location and/or orientation of the first member 2 and second member 3 relative to each other by sliding the first member 2 and second member 3 within the midsection 100. Generally, the apparatus, when releaseably secured to a container handling means, is capable of expanding and contracting in a lengthwise direction with the container handling means using a power source of the container handling means, such as a spreader bar and the spreader power drive providing the force needed to expand and contract the apparatus. Because the apparatus is releasably secured to the container handling means, the first member and second member are held in relationship to each other within the midsection by the container handling means.

In the embodiment of the apparatus, having at least a length (l), illustrated in the drawings, particularly FIGS. 1 and 2, the first member 2 is generally U-shaped having a pair of opposing substantially parallel legs, a first member distal leg **2*d* and a first member forward leg 2*f*, separated by a first member gap 101. The first member distal leg 2*d* and first member forward leg 2*f* each have a first end and a second end and the first member 2 comprises a first member joining section 102 which is secured to or integral with a first end of each of the first member distal leg 2*d* and first member forward leg 2*f***.

The second member 3 is also generally U-shaped and comprises opposing substantially parallel second member distal leg **3*d* and second member forward leg 3*f*, separated by a second member gap 108 and each of the second member distal leg 3*d* and second member forward leg 3*f* have first and second ends. The second member further comprises a second member joining section 103 secured to or integral with the first end of each of the second member forward leg 3*f* and second member distal leg 3*d***.

The midsection 100 comprises a distal piece **100*d* and a forward piece 100*f* each of which have first and second end (in FIG. 1, the first end of the distal piece is designated as element 115, the second end of the distal piece is designated as element 116, the first end of the forward piece is designated as element 117, and the second end of the forward piece is designated as element 118). The distal piece 100*d* and forward piece 100*f* are each hollow having an inner wall and an outer wall with the inner wall of each defining sleeves (the distal section sleeve 5*d* and forward section sleeve 5*f*). The midsection 100 further comprises a first end piece 104 and a second end piece 105. A first end (115, 117) of each of the distal piece 100*d* and forward piece 100*f* are secured to or integral with the first end piece 104, and the first end piece 104 is about perpendicular to both the distal piece 100*d* and forward piece 100*f*. A second end (116, 118) of each of the distal piece 100*d* and forward piece 100*f* are secured to or integral with the second end piece 105, and the second end piece 105 is about perpendicular to both the distal piece 100***d* and forward piece 100*f*.

The apparatus is preferably adjustable along its length (l), and can be adjusted to accommodate a standard ISO container. As shown in FIGS. 1 and 2, the midsection 100 has a first end and second. For purposes of illustration these are designated in the drawings as 100*l* and 100*r*. The ends of the first member distal leg 2*d* and first member forward leg 2*f* opposite to the first member joining section are each capable of insertion into the distal sleeve 5*d* and forward sleeve 5*f* at, for example, the first end 100*l*. Likewise, the ends of the second member distal leg 3*d* and second member forward leg 100*f* are each capable of insertion into the distal sleeve 5*d* and forward sleeve 5*f* at, for example, the second end 100*r*. The ability to adjust the amount of each leg that is within the sleeves, provides the apparatus with the capability of having an adjustable length (l) so that it can fit various size container handling means throughout the world. As shown in FIGS. 1 and 2, the first member distal leg and second member distal leg may be offset from each other, and the first member forward leg and second member forward leg may be offset from each other to maximize the amount of leg that may be inserted into the sleeves. Because the apparatus is releasebly secured to the container handling means, the first member distal leg and second member distal leg, and the first member forward leg and second member forward leg remain fixed in relation to each other resulting in a length corresponding to that of the container handling means during loading and unloading operations thereby preventing the first member distal leg and second member distal leg, and the first member forward leg and second member forward leg from sliding during use.

It should be understood that ISO containers have a standard width that does not vary with the length of the containers and, accordingly, in the most preferred embodiment of the invention there is not adjustment capability of the width of the apparatus. An apparatus, however, with an adjustable width having elements similar to those described above for adjustment of the length is also within the scope of the invention.

The apparatus comprises one or more detection means comprising one or more scanners, preferably three detection means, which can detect nuclear, chemical or biological weapons. The detection means may be gamma spectroscopy, independent gamma and neutron detection, X-ray, penetrating radiation, electromagnetic radiation and the like, and combinations thereof, provided the detection means is capable of detecting weapons of mass destruction, such as nuclear, biological and chemical weapons. For example, the detection means may detect gamma and neutral radiation being emitted from the container while the container is being loaded or unloaded. In the preferred embodiment comprising three detection means, there is one set of detection means on each end and detection means in the middle. The detection means may comprise one or more sensors that sense that a container is latched to the apparatus and signals optical character recognition means as discussed below. The detection means are preferably within detection means modules. An example of detection means useful in the apparatus are Bicron Nuclear Radiation Detection Systems, particularly ASM 345 GN, available from Thermo RMP, Salon, Ohio, USA.

In the embodiment of the invention shown in the drawings, the detection means are within detection means modules that are incorporated within the first member 2, second member 3, and midsection 100. Referring to FIG. 1, the first member 2 comprises one detection means module (6*a*) that is generally perpendicular to and between the first member distal leg 2*d* and first member forward leg 2*f* proximate to the first member joining section. The midsection 100 comprises one detection means module (6*b*) in about a center of the midsection 100 perpendicular to and between the distal piece 100*d* and forward piece 100*f*. The second member 3 in the embodiment shown in FIGS. 1 and 2 comprises one detection means module (6*c*) which is generally perpendicular to the second member distal leg 4*a* and second member forward leg 4*b* proximate to the second member joining section 103. It should be understood that although the apparatus depicted in the drawings comprises three detection means modules, the apparatus may comprise any number of detection means modules and detection means.

The apparatus may also be equipped with optical character recognition means 112, such as one or more digital cameras. The digital cameras are preferably located at or near the first member joining section 102, the second member joining section 103 or both. For example, once sensors of the detection means indicate the connection of a container to the apparatus, one or more digital cameras are activated and photograph the container number located on the roof of the container. These images are digitally cleaned and converted to data and can be transmitted with the data from the detection means. The optical character recognition means substantially reduces, and can eliminate, the possibility of the radiation sensor readings being applied to the wrong container.

The power to, at least, operate the detection means, optical character recognition means and any equipment necessary for transmission of data from the apparatus the local processing system may be supplied by an external source through the container handling means or otherwise by cables. In an embodiment of the invention, however, the apparatus comprises its own power supply at a location on the apparatus, which eliminates the need to attach cables to the apparatus prior to operation and alleviates the need for special adaptors or equipment that may be necessary because of differences in power sources and supply hardware in different countries and regions. The apparatus may comprise one or more power supply units. The power supply unit is generally a rechargeable battery or other type device for generating electrical energy, and preferably capable of maintaining at least a 24 hour charge. The power supply may be re-chargeable or it may be a replaceable battery or energy source. Because the length apparatus will generally be adjusted by the spreader bar, no separate power source is needed to adjust the length of the apparatus.

Figure 3:
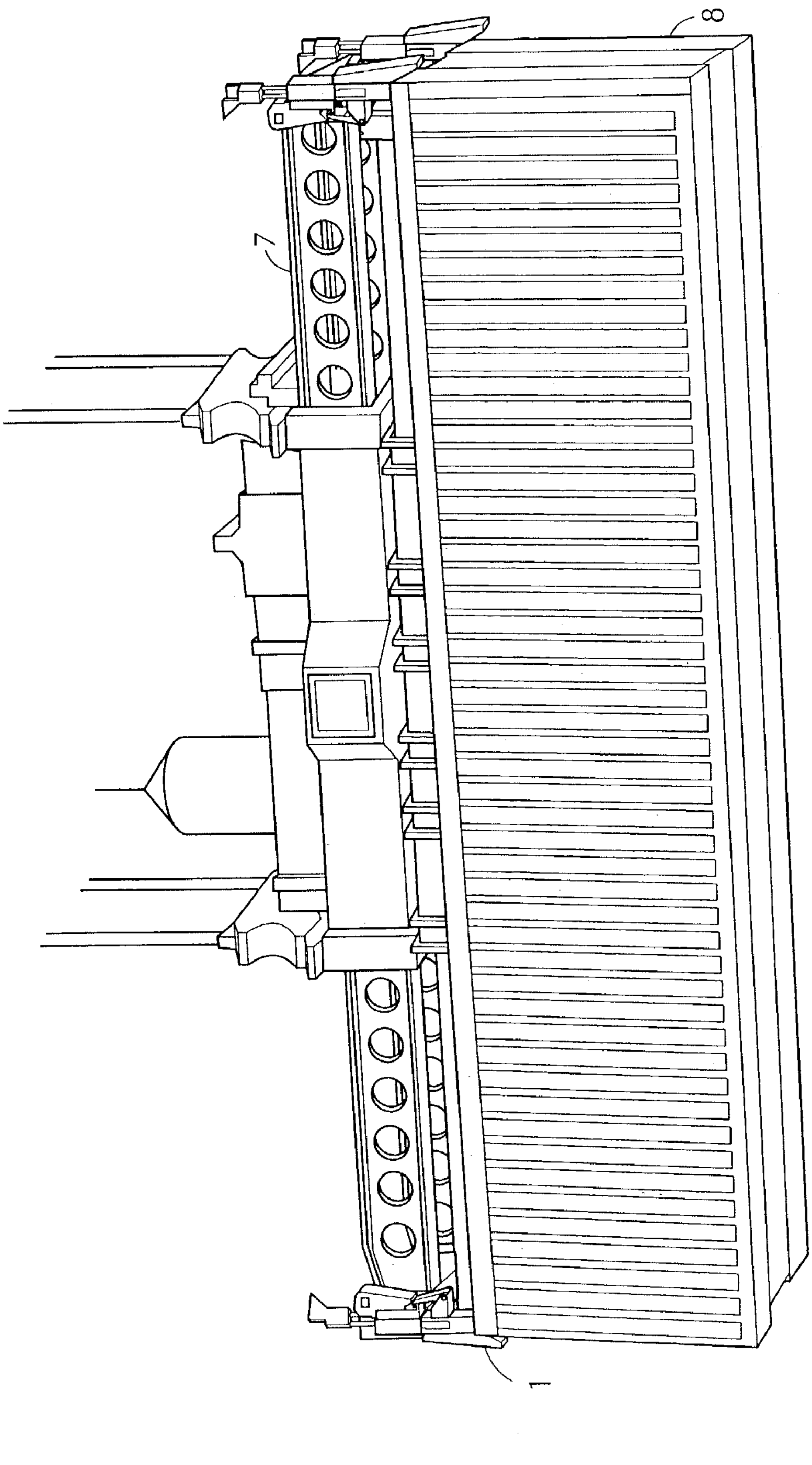
FIG. 3 is a perspective view the apparatus in accordance with an embodiment of the invention attached to a crane spreader bar.
Figure 4:
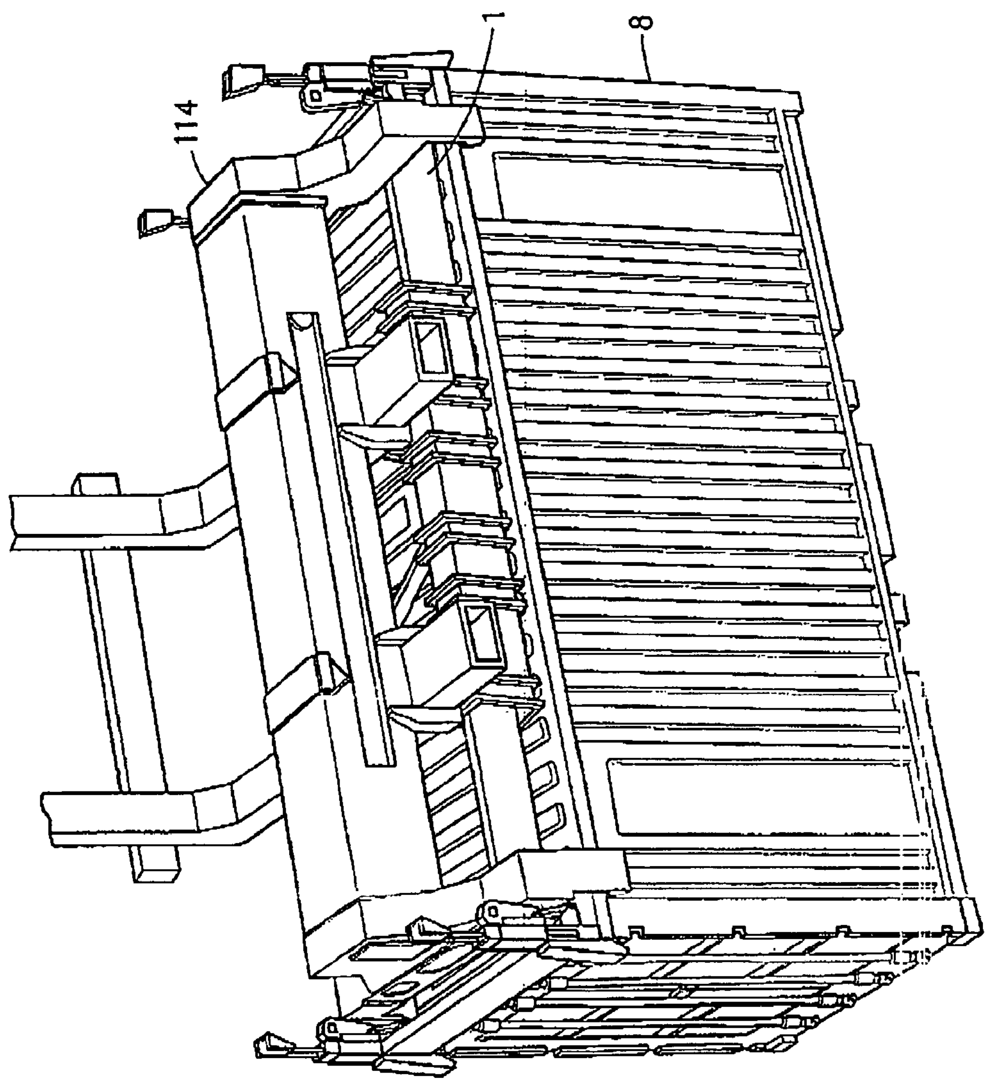
FIG. 4 is a perspective view of the apparatus in accordance with an embodiment of the invention attached to a top pick.

The apparatus can be releaseably secured to container handling means by apparatus securing means. Examples of container handling means are a crane spreader bar, top pick, top handler, transtainer, straddle carrier and the like. Some non-limiting examples of the use of the apparatus are the loading and unloading of a ship or other vessel with a cargo crane and a crane spreader bar and the loading or unloading of a train using a top pick or other device. FIG. 3 shows the apparatus 1 releaseably secured between a crane spreader bar 7 and cargo container 8, and FIG. 4 shows the apparatus 1 releaseably secured between a top pick 114 and a cargo container 8.

The apparatus securing means may be any type of device, or combinations of devices that can be used to secure a cargo container to a crane spreader bar. By way of non-limiting examples, the apparatus securing means may comprise nuts, bolts, pins, twist locks, magnets, other fasteners and the like.

The preferred apparatus securing means (shown in FIG. 2 as 106), as shown in FIGS. 5–9, involves the use a latching arm on the apparatus and lug on the container handling means. The apparatus will comprise one or more of the preferred apparatus securing means, most preferably four of these apparatus securing means, located proximate to about each corner (shown as a, b, c and d in FIG. 1) of the apparatus.

In the embodiment shown in FIGS. 5–9, the preferred apparatus securing means comprises a latching arm 11 having three segments which are an arm element 16, having a first end and a second end, a pivoting section 15, having a first end, second end, upper surface **15*u* and lower surface 15*l* and a clasp element 17. The preferred apparatus securing means further comprises a spring element 13 having a first end and a second end and a bridging section 14 having a first end and a second end. The apparatus securing means further comprises a locking pin 12 proximate to the pivoting section 15**.

The arm element 16 is, at one end adjacent to the clasp element 17 and, at the opposite end, adjacent to the pivoting section 15. The pivoting section may further comprise an opening **15*b* to accommodate an axle as shown in FIGS. 5–9. One end of the spring element 13 is fastened to some point along the upper surface 15*u* of the pivoting section 15 by first fastening means 18. The other end of the spring element 13, or a portion of the spring element 13 proximate to the other end, is fastened to the bridging section 14 by second fastening means 19. The bridging section 14 is secured at the other end to the apparatus by third fastening means or welding or is integral with the apparatus. This preferred apparatus securing means further comprises one or more, most preferably four, lugs 20 each secured to the spreader bar 7 proximate to the location of the twist locks 21 of the spreader bar. The number and locations of the twist locks should be understood to one skilled in the art. Each lug 20 has a lug recessed section 22 and a lug hook section 23. The lug 20** is either integral to the spreader bar or attached to the spreader bar by welding or other securing means. The lugs may have similar design as those used in the Bromma Self Latching HSM-6 SPEEDLOADER® available from Bromma, Inc., Roxboro, N.C., USA.

The first, second and third fastening means may be any type of fastener, such as those be selected from the group consisting of welds, bolts, nuts, screws, jam nuts, roll pins, set screws, self-locking nuts, cotter pins, spring clips, lock washers, combinations thereof and the like. It should be understood that reference in this Specification to fastening means shall refer to the types of fastening means discussed above with respect to the first, second and third fastening means.

As shown in FIGS. 1, 2 and 5–9, the apparatus further comprises a shaft 109 having a first end and a second end with a first end capable of having contact with the twist lock 21 of the container handling means 111 (also shown as 7 in FIG. 3 and 114 in FIG. 4) and the second end of the shaft being secured to an apparatus twist lock 110. The twist lock 21 of the container handling means 111 is capable of rotating the shaft 109 and apparatus twist lock 110. The shaft 109 and apparatus twist lock 110 are located proximate to each of the apparatus securing means 106 and the shaft will be substantially aligned with the twist lock 21 of the container handling means 111 when the apparatus 1 is releaseably secured to the container handling means 111.

Figure 5:
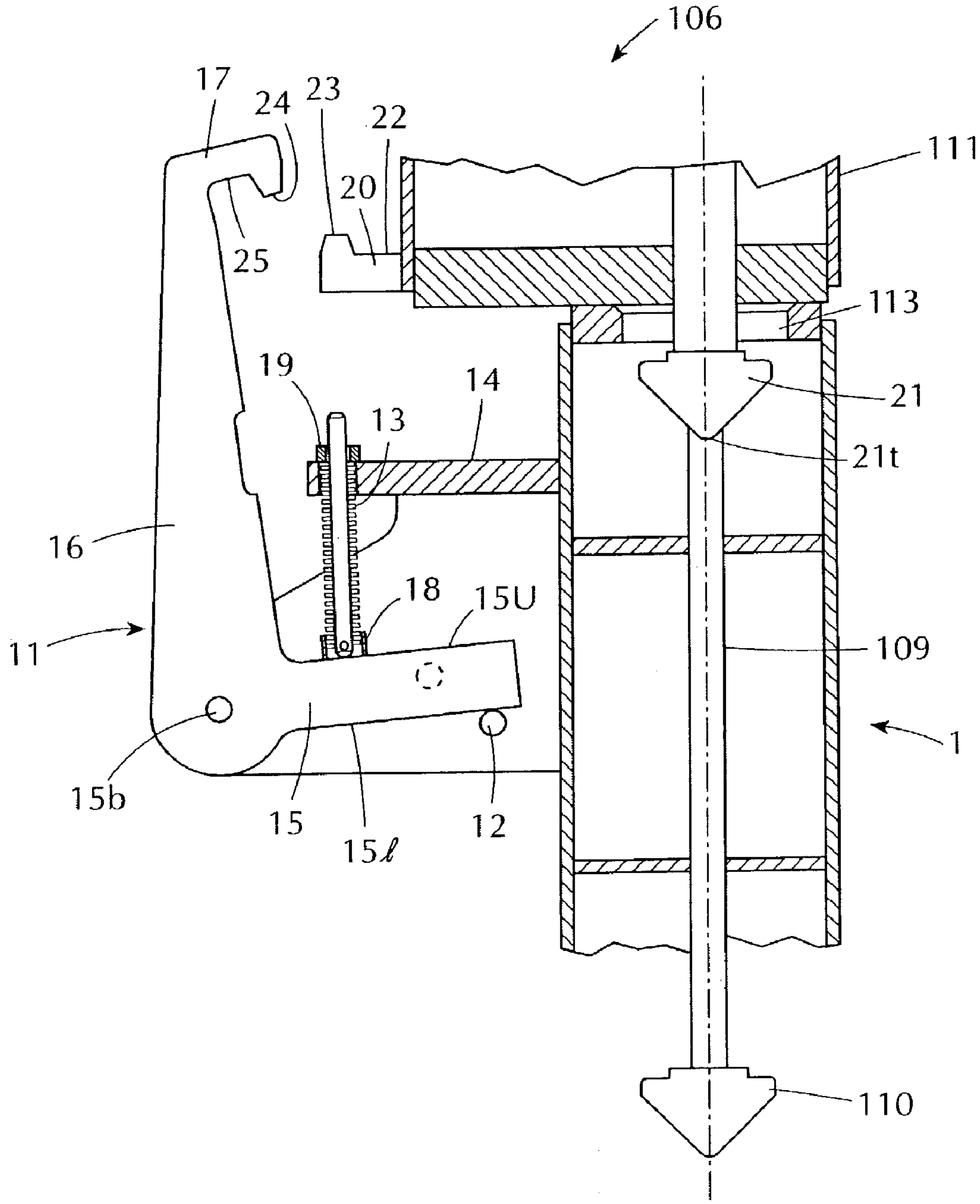
FIG. 5 is a side view of the apparatus securing means in accordance with an embodiment of the invention in an unlocked position and the twist lock in an engaged position.
Figure 6:
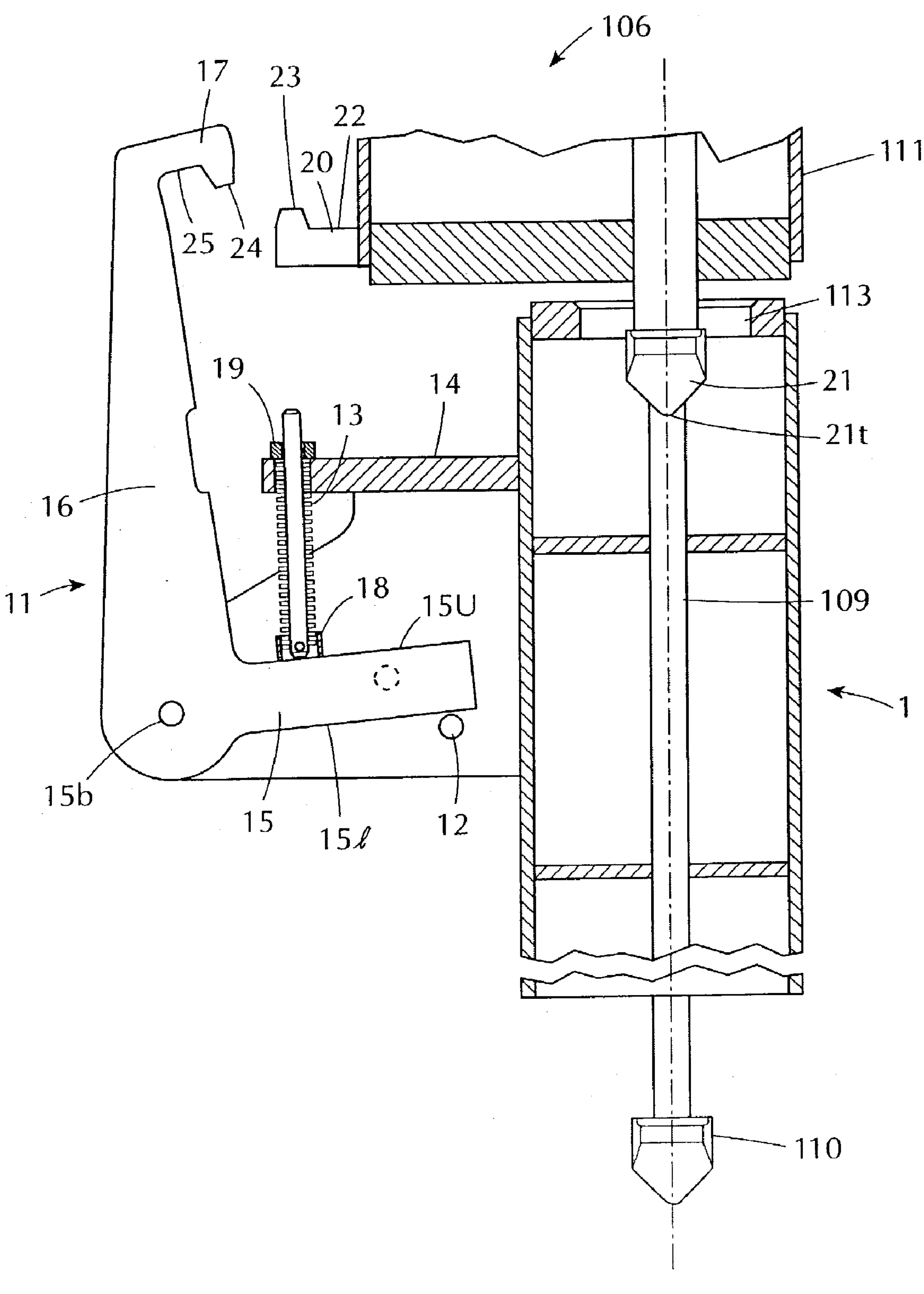
FIG. 6 is a side view of the apparatus securing means in accordance with an embodiment of the invention in an unlocked position with the twist lock in an engaged position.
Figure 7:
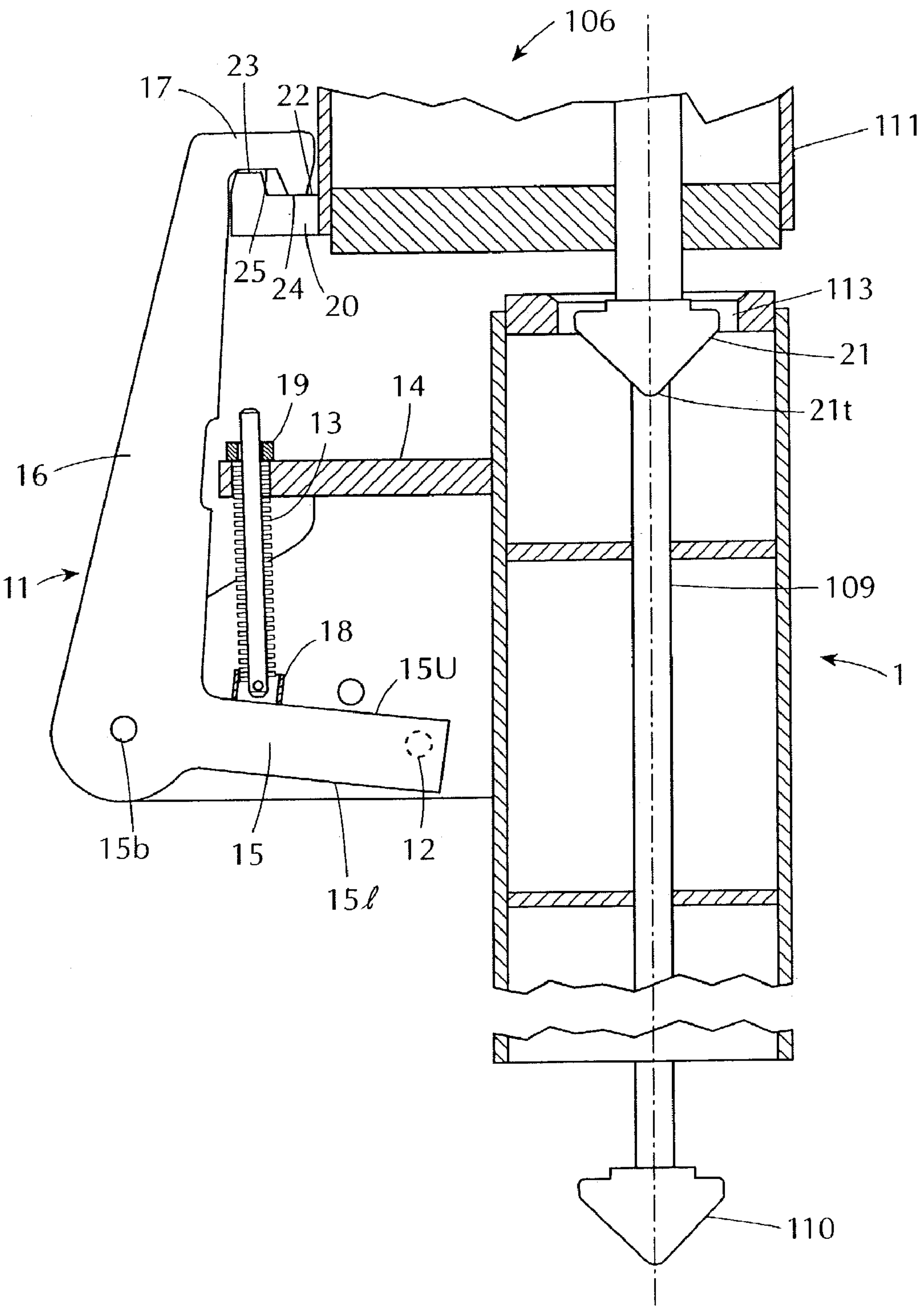
FIG. 7 is a side view of the apparatus securing means in accordance with an embodiment of the invention in a locked position and the twist lock in an engaged position having no load from a cargo container (i.e. not hoisting a cargo container).

FIG. 5 shows the preferred apparatus securing means in an unlocked position. When unlocked, the locking pin 12, which is releaseably secured to the apparatus, is proximate to and in contact with, or substantially in contact with, the lower surface **15*l* of the pivoting section 15 which prevents the latching arm 11 from pivoting into position over the lug 20. When the container handling means 111 is aligned with the apparatus 1, the twist locks 21 become inserted into an opening 113 of the apparatus 1 and as tip 21*t* of the twist lock 21 comes into contact with shaft 109. The twist locks 21 of the container handling means 111 are rotated about 90 degrees which causes the apparatus twist locks to likewise turn about 90 degrees to lock the spreader bar and apparatus, into one unit, as shown in FIG. 6. After the spreader bar and apparatus are locked, the apparatus can be lifted off the ground and the latching arm 11 is then pivoted into locking position with the spreader bar 7. As shown in FIG. 7, the locking pin 12 is removed, latching arm 11 is moved into an engaged position and the locking pin is replaced so to that it is in contact with, or substantially in contact with, the upper surface 15*u*** of the pivoting section.

As shown in FIGS. 5–9, the clasp element 17 of the latching arm 11 has a clasp hook section 24 and a clasp recessed section 25 to engage the latching arm 11. When in an engaged position, the latching arm 11 is moved so that the clasp hook section 24 is substantially aligned with the lug recessed section 22 and the clasp recessed section 25 is substantially aligned with the lug hook section 23. After alignment, the locking pin is replaced in contact with, or substantially in contact with, the upper surface **15*u* of the pivoting section which locks the clasp section 17 in a position substantially aligned with the lug 20**, after which, the twist lock may be turned about 90 degrees to an unlocked position without the apparatus becoming disengaged from the container handling means.

Figure 8:
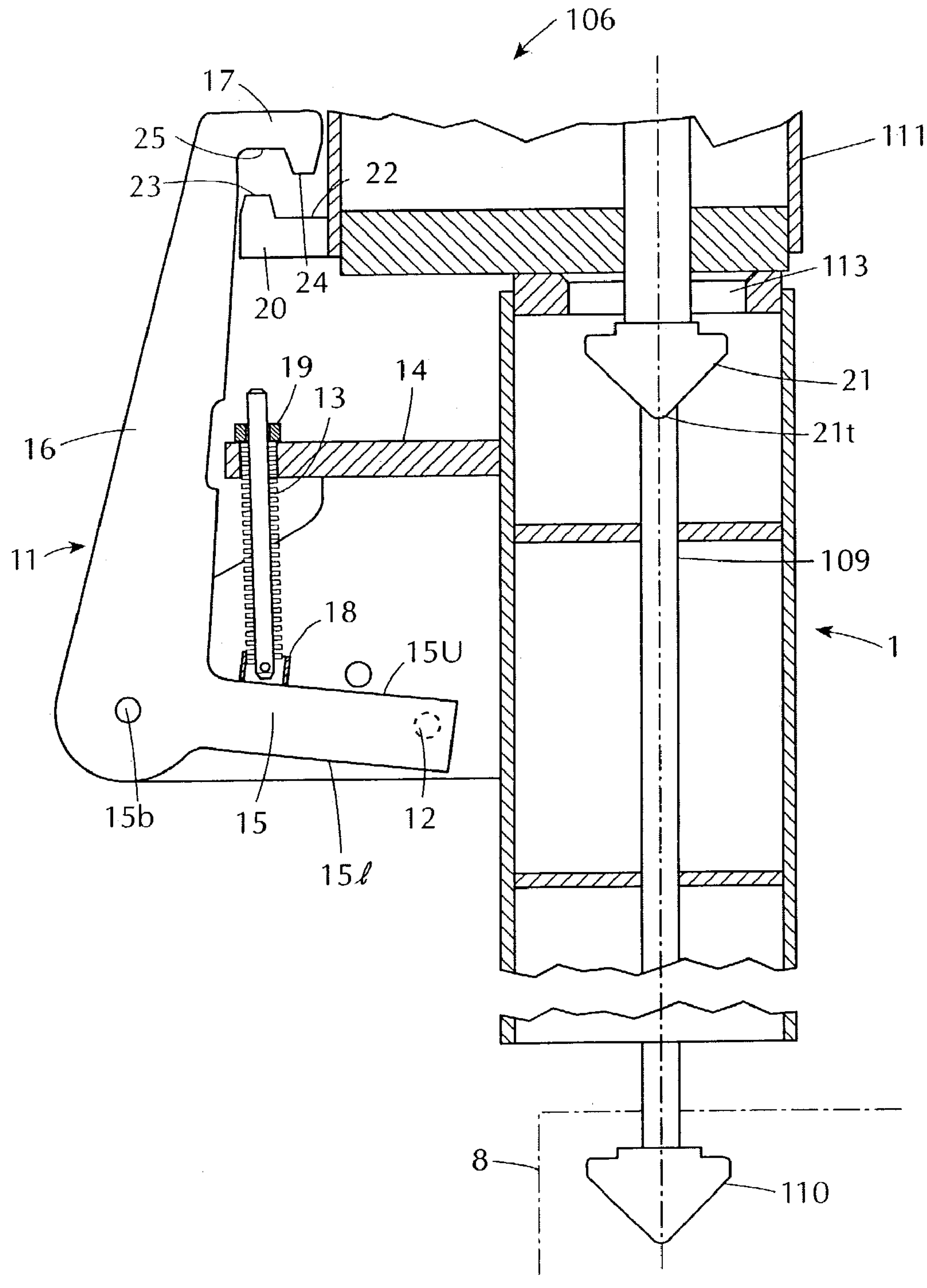
FIG. 8 is a side view of the apparatus securing means in accordance with an embodiment of the invention in a locked position with the twist lock in an engaged position having load from a cargo container (i.e. while hoisting a cargo container).
Figure 9:
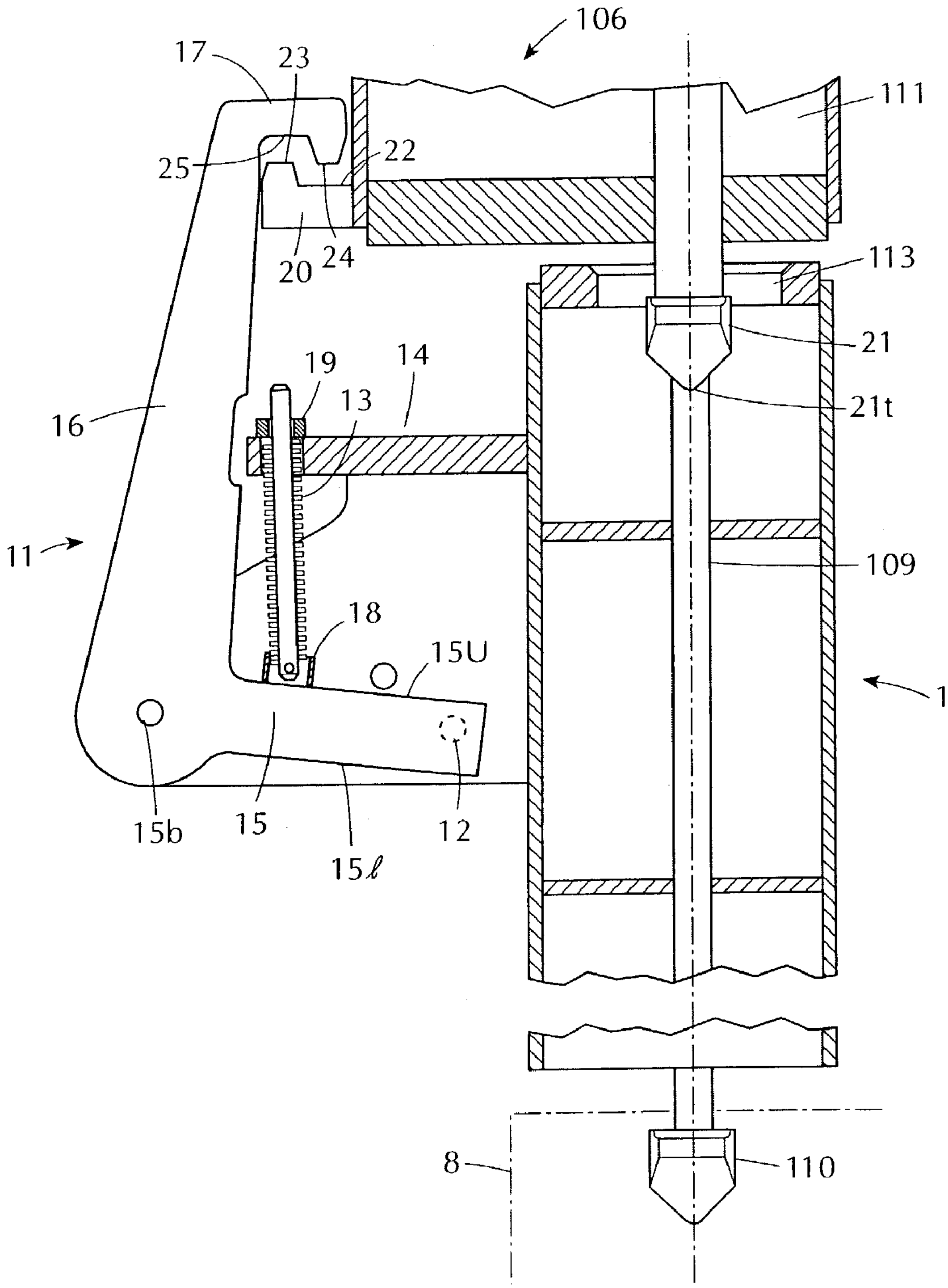
FIG. 9 is a side view of an apparatus securing means in accordance with an embodiment of the invention.

FIG. 8 shows the apparatus 1 and apparatus securing means 111 engaged without the load of a cargo container in which condition the clasp hook section 24 is substantially aligned and substantially in contact with the lug recessed section 22 and the clasp recessed section 25 is substantially aligned with and substantially in contact with the lug hook section 23. In the engaged position, the twist lock 21 of the container handling equipment and apparatus twist lock 110 are rotated into an unlocked position. The engaged apparatus 1 and container handling means 111 may, as shown in FIG. 9, be aligned with a cargo container 8 and the apparatus twist lock 110, in an unlocked position inserted into one or more openings on the top of the cargo container. One skilled in the art would appreciate that the openings in the top of the cargo container are standard in size and location for standard ISO containers. After the apparatus twist locks 110 are inserted into the openings on the cargo container, the twist lock 21 of the container handling means can be rotated by the container handling means which also rotates the apparatus twist lock 110, both into locked position. In this manner the container handling means, apparatus and cargo container are locked for loading or unloading cargo containers, and in the locked position the clasp element 17 and lug 20 are aligned but not substantially in contact with each other. After the loading of cargo containers is finished, the spreader bar and apparatus are moved to a position where ground or ship personnel can remove the locking pin 12, move the latching arm 11 to the unengaged position (e.g. unlatched), and re-insert the locking pin as shown in FIG. 6.

Figure 10:
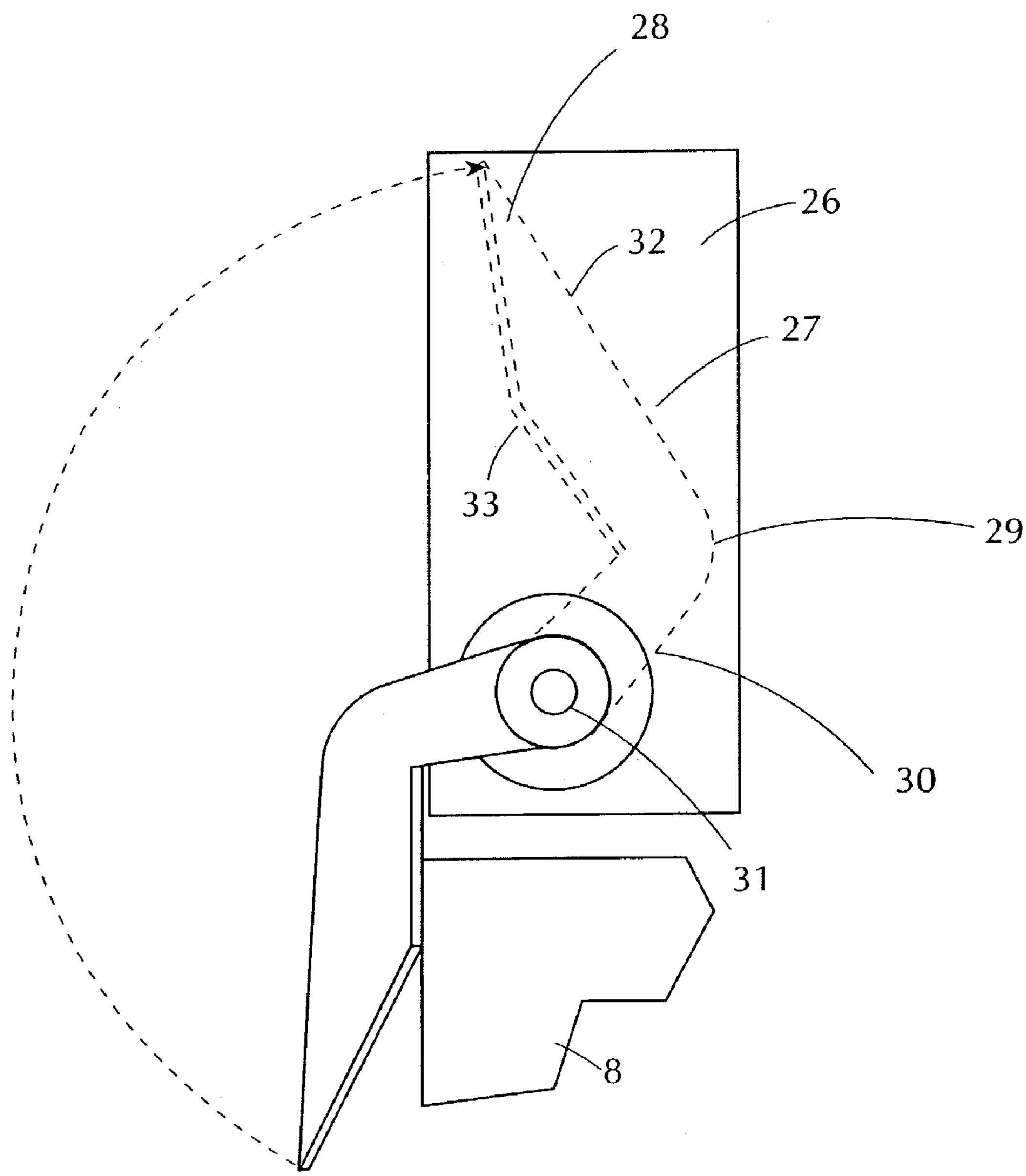
FIG. 10 is a side view of a container aligning means in accordance with an embodiment of the invention.

The apparatus may also comprise container aligning means that assist with the alignment of the container handling means and apparatus with the cargo container so that the apparatus twist locks can be aligned with the opening on the cargo container. The container aligning means (shown in FIG. 2 as 107) may comprise a remote activated flipper device as shown in FIG. 10. The apparatus can comprise one or more remote activated flipper devices, preferably four secured to the apparatus by welding or other means located proximate to about each corner of the apparatus (shown as a, b, c and d in FIG. 1). The remote activated flipper device has a flipper 27 having an upper arm 28 with at least two ends, an elbow 29 with at least two ends and lower arm 30 with at least two ends. The lower arm 30 preferably has a first end and second end and a bore hole 31 at one end with the other end adjacent to one end of the upper arm at the elbow 29. The flipper 27 is secured to a rotary actuator (not shown) at the bore hole 31. The upper arm 28 may be about perpendicular to the lower arm 30 as shown in FIG. 10, but need not be perpendicular. The end of the upper arm 20 opposite to the elbow 30 is angled such that an outer surface 32 of the upper arm 28 has a greater length than an inner surface 33 of the upper arm 28. The rotary actuator is powered by hydraulics which are capable of rotating the flipper 27 and moving the flipper 27 in a position as shown in FIG. 10 wherein the inner surface 33 of the upper arm 28 comes into contact with, or substantially in contact with, the cargo container 8 and aligns the apparatus 1 and container handling means with the cargo container to facilitate inserting the apparatus twist locks in the openings on the container.

Figure 11:
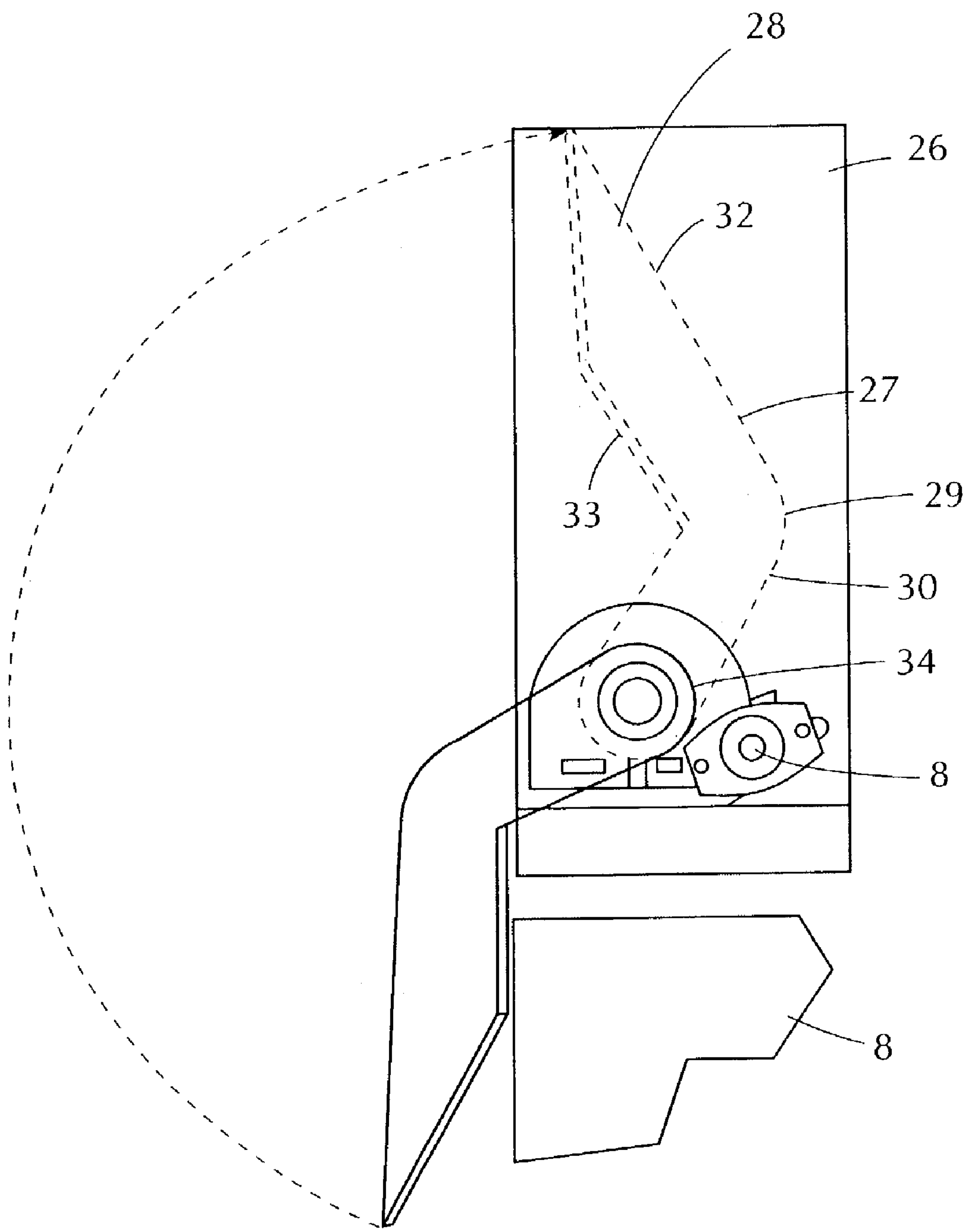
FIG. 11 is a side view of a container aligning means in accordance with an embodiment of the invention.

FIG. 11 shows an embodiment of the remote activated flipper device similar to that shown and described with respect to FIG. 10. In the device of FIG. 11, however, the flipper 27 is attached at the bore hole 31 to a rod having a first gear piece 34. A second gear piece 35 that mates with and is in communication with the first gear piece 34 is secured to a rotary actuator (not shown). When the rotary actuator is activated it turns the second gear piece 35 that turns the first gear piece 34 and rotates the flipper into position on the cargo container, such that the inner surface 33 of the upper arm comes into contact with, or substantially in contact with, the cargo container 8 as described above.

Figure 12:
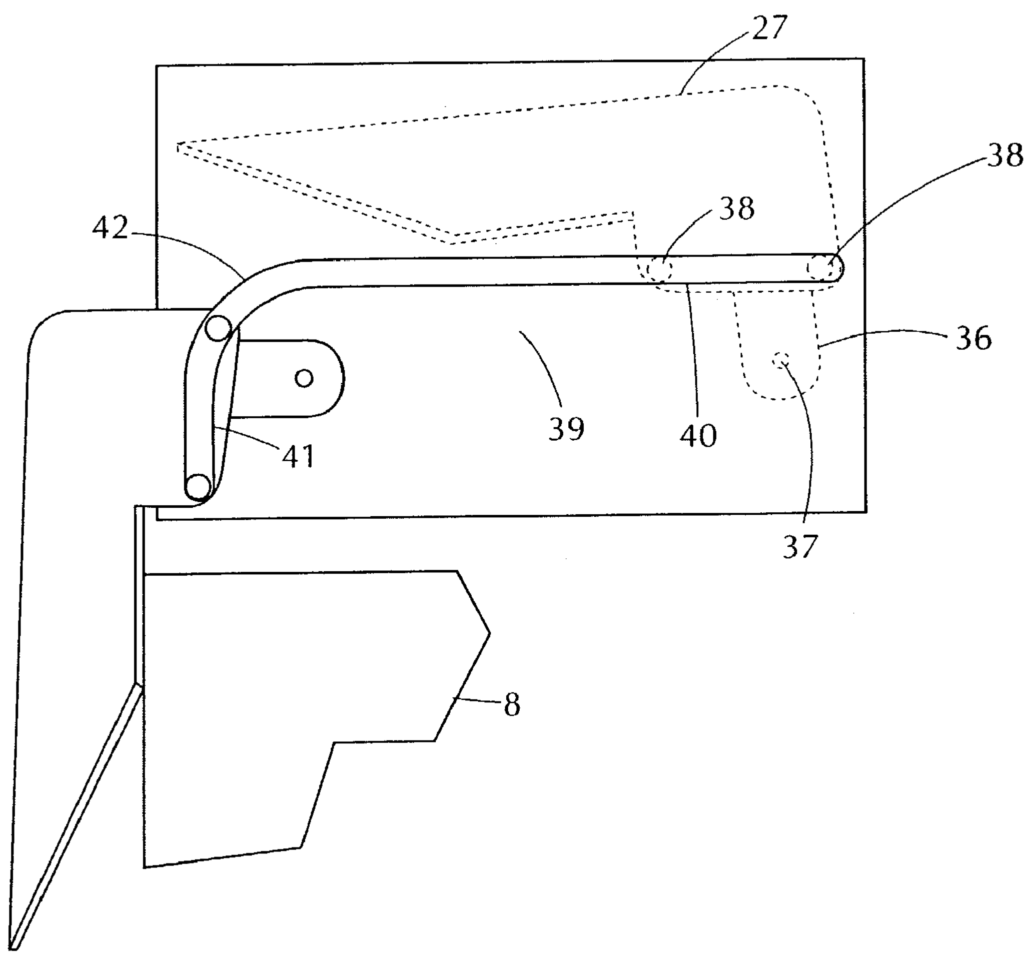
FIG. 12 is a side view of a container aligning means in accordance with an embodiment of the invention.

FIG. 12 shows a further embodiment of the remote activated flipper device wherein the flipper 27 is modified to have a extended piece 36 adjacent to the lower arm 30 at the end opposite to the elbow 29 with a second bore hole 37 in the extended piece 36. The flipper is equipped with one or more, preferably two, guide elements 38, which may be wheels having axles that are secured to the flipper 27 about adjacent to the end of the lower arm 30 opposite the elbow 29 that are inserted into a guide trough 39. The guide trough 39 has a horizontal piece 40 with first and second ends and a vertical piece 41 with first and second ends with a curved piece 42 between an end of the horizontal piece and an end of the vertical piece. The horizontal piece 40 and vertical piece 41 are preferably about perpendicular to each other. An actuator (not shown) is secured to the bore hole 37 and when the actuator is activated the actuator moves the flipper 27 from a position aligned with the horizontal piece 40 of the guide trough 39 to a position aligned with the vertical piece 41 of the guide trough 39 such that the flipper 27 is in position on the cargo container.

Figure 13:
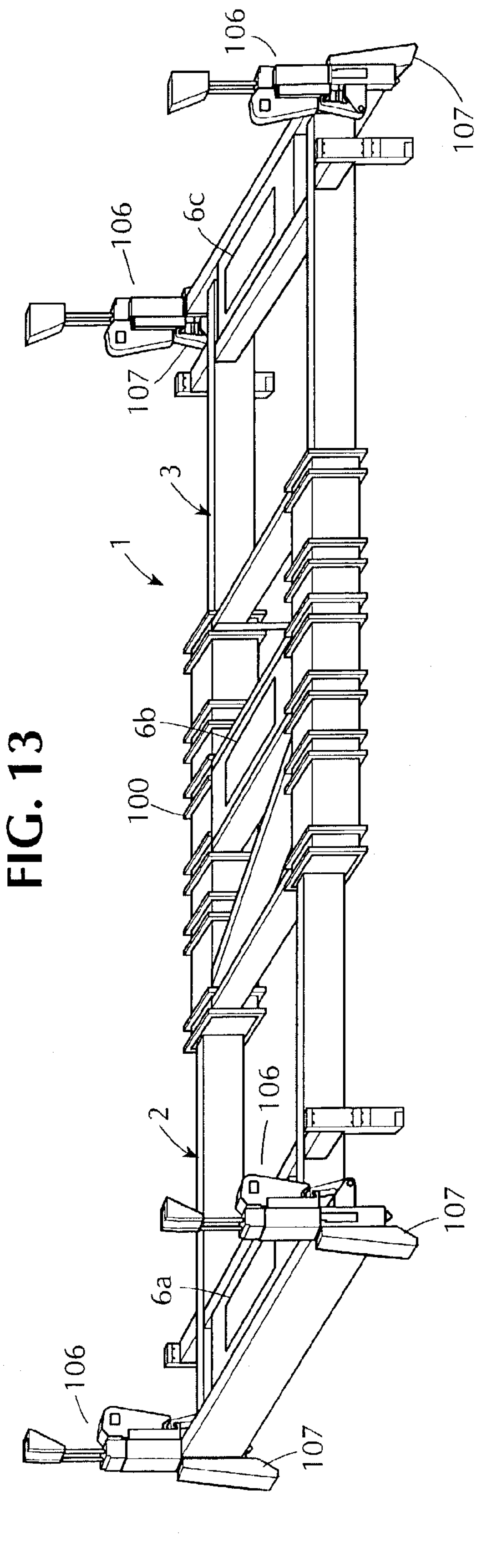
FIG. 13 is a perspective view of the apparatus in accordance with an embodiment of the invention.

FIG. 13 shows a perspective view of an apparatus 1 in an embodiment of the invention comprising a first member 1, second member 3 and midsection 100. The apparatus 1 has three detection means modules (6*a*, 6*b*, 6*c*). Each corner of the apparatus illustrated in this figure also has at least one apparatus securing means 106 and at least one container aligning means 107.

The apparatus may preferably comprise one or more sensors that will sense that the spreader bar and apparatus have latched a container. In this embodiment, the sensors will signal the detection means and optical character recognition means to activate when the cargo container is latched to the spreader bar and apparatus and then signal the detection means and optical character recognition means to deactivate when the cargo container is no longer latched.

The apparatus functions as part of a system and method for detecting weapons of mass destruction that allows authorities to confirm that cargo containers entering their sovereign territory, or traveling within the sovereign territory, do not contain weapons of mass destruction or other dangerous cargo. In the most preferred embodiment of the invention, cargo containers are scanned with the apparatus when the cargo containers are loaded onto a transportation means and, thus, the apparatus and system will allow for the detection of weapons of mass destruction prior to a cargo container being loaded onto the transportation means thereby permitting the carrier to reject cargo containers comprising or potentially comprising weapons of mass destruction or any questionable contents. Accordingly, the apparatus and system provides a deterrent to attacking a sovereign nation with weapons of mass destruction on a transportation means or smuggling such weapons into a nation by common carrier. Non-limiting examples of transportation means include ships, trains, motor vehicles, airplanes, helicopters, space shuttles or other space vehicles, and the like.

The preferred method comprises releasably securing the apparatus to the container handling means as discussed above at the beginning of the loading procedure with the use of the apparatus securing means and container aligning means. The detection means may be active throughout the loading procedure. However, in the preferred method, the apparatus is equipped with sensors that detect the container when it is secured to the apparatus and spreader bar and activates the detection means, such that the scanning process will continue during the load or discharge of the container until the cargo container is released from the apparatus and container handling means. The detection means compiles data and information regarding the container contents, such as data relevant to the presence of weapons of mass destruction. The data is transmitted to a software application that can consolidate the readings for each container and produce an average reading for each scanned container. The software will support data collection from multiple, installed scanners and, as appropriate, calculate the averages based on the logic programmed in the apparatus firmware module. In addition, the method optionally comprises activation of the optical character recognition means, which obtains a digital image of the container number when the sensors detect that the container handling means and apparatus have secured a cargo container. The digital image can be digitally cleaned and converted to data by the software application.

The data is reported to a local processing systems, which may be located on the transportation means or near the point of loading and/or unloading. For example, when the transportation means is a ship or other sea worthy vessel, the local processing system is preferably located in the ship, most preferably on the bridge of the ship, and when the transportation means is a train, the local processing system is preferably located at or in the proximity of the rail yard where loading and unloading operations are conducted. In certain embodiments of the invention, however, the data may be sent directly to a central processing unit, such as a governmental agency or its representative, when the apparatus can function to directly transmit the data without the need of a local processing system. Examples are when the apparatus is operated at a land based site in or near the point of destination, or the detection means is capable of communicating directly with the central processing system.

In addition, the apparatus may comprise an audible and/or visual alarm that is activated when the detection means detects conditions, e.g. compiles data, indicating the potential presence of weapons of mass destruction in the container. The alarm alerts the crane operator, persons loading the transportation means and any other interested parties.

This local processing system may include a database of containers to be loaded onto the transportation means. This information is readily available in the industry and can be received through a standard STOW PLAN. Each container record in the database will generally hold the container number, carrier name, shipment reference number and stowage location. As the containers are "cleared" by the scanners, a flag can be set for each container that indicates that it is approved for transit.

The system and method can be extended to carry actual sensor readings. This would allow different agencies to set their own threshold values. If a container scan exceeds the threshold and a weapon of mass destruction is detected, the container will be flagged in the system and an alert will go out to the proper authorities, as well as to the crew and/or operator of the transportation means.

In a most preferred embodiment of the invention, data from the detection means and the optical character recognition means on the apparatus is transmitted to the local processing system utilizing an open wireless communication standard. This local processing system will capture the data which can be compared to each container record on the vessel-based system. The data on weapons of mass destruction can be incorporated into a shipping manifest and/or the status of the container, such as checked, cleared or the like, indicating the absence of conditions indicating weapons of mass destruction can be noted on the manifest.

Currently empty containers loaded on to transportation means are not always manifested. Integration with the vessel bridge will help to identify empty containers loaded on the vessel that are not planned for loading. These containers are a potential method for transporting weapons.

The system may further comprise means for communication for transmitting the data from the local processing system to a central processing system, which may be located at an agency or governmental representative of the country where the cargo containers will be delivered or within which the cargo containers will travel. The means for communication is generally wireless communication, preferably through satellite systems. For example, in the case of ships, the data can be communicated from the local processing system on the vessel to a central processing unit of a governmental authority or private contractor retained to monitor the data and movement of cargo destined for or moved within a sovereign country, and, in the case of train transportation the data may be transmitted from the local processing system at or near the loading point or on the train to a central processing unit in sovereign country where the train will deliver the cargo or within the sovereign country where the train is carrying the cargo. The data transmitted by the aforementioned means for communication may be incorporated into a shipping manifest for one or more containers.

The method is a function of the reliability and sensitivity of the sensors, detection means and optical character recognition means of the apparatus. A concern with mounting sensitive equipment on a container handling means is the damage that might be incurred from shock, vibration, and exposure to the environment when the apparatus is in use as well as when it is in storage on a transportation means or within a loading dock, rail yard or other location where cargo may be loaded or unloaded. To mitigate potential damage, the apparatus and particularly the detection means and/or detection means modules may be equipped with shock-mounting and environmental protection. For example, the power source, (e.g. batteries), detectors, sensors, software, and communication components may be incorporated in a manner that will allow the system to operate at the same reliability rates as a standard container handling means, such as placement in detection means modules having shock protection means and environmental protection means.

Since there is the possibility of using many different types of detectors and sensors over the life of the apparatus, the structure of the apparatus has an open architecture. The open architecture provides for interchanging scanners depending on which product can provide the best and most reliable results for the particular cargo, cargo container and/or weapon of concern.

We claim:

1. An apparatus for detecting weapons of mass destruction having at least a length and capable of being releaseably secured between container handling means and a cargo container wherein the apparatus comprises

- a) a first member having a first member distal leg with at least two ends, a first member forward leg with at least two ends and a first member joining section about perpendicular to and adjacent to a first end of the first member distal leg and a first end of the first member forward leg,
- b) a second member having a second member distal leg with at least two ends, a second member forward leg with at least two ends and a second member joining section about perpendicular to and adjacent to a first end of the second member distal leg and a first end of the second member forward leg,
- c) a midsection having a distal piece with an inner wall defining a distal section sleeve, an outer wall, a first end and a second end and a forward piece with an inner wall defining a forward section sleeve, an outer wall, a first end and a second end with a first end piece adjacent to and about perpendicular to the first end of each of the distal piece and the forward piece and a second end piece adjacent to and perpendicular to a the second end of each of the distal piece and the forward piece wherein a second end of the first member distal leg is inserted into the distal section sleeve at the first end of the distal piece, a second end of the second member distal leg is inserted into the distal section sleeve at the second end of the distal piece, a second end of the first member forward leg is inserted into the forward section sleeve at the first end of the forward section sleeve and a second end of the second member forward leg is inserted into the second end of the forward section sleeve wherein the first member distal leg and second member distal leg are adjustable lengthwise within the distal section sleeve and the first member forward leg and second member forward leg are adjustable lengthwise within the forward section sleeve such that the length of the apparatus is adjustable.
- d) one or more apparatus securing means each comprising
  - i) one or more latching arms each having
    - 1) an arm element having a first end and a second end, a pivoting section having a first end, second end, upper surface, lower surface and an opening for an axle and a clasp element having a clasp recess section and adjacent thereto a clasp hook section with one end of the arm element adjacent to the clasp element and the opposite end of the arm element adjacent to an end of the pivoting section, 2) a bridging section having a first end and a second end having one end integral with or secured to the apparatus, and 3) a spring element having a first end and a second end fastened at one end to the upper surface of the pivoting section by first fastening means and at the opposite end fastened proximate to the end of the bridging section opposite to the apparatus, ii) one or more locking pins releaseably secured to the apparatus, and wherein the apparatus securing means is capable of releaseably securing the apparatus to the container handling means selected from the group consisting of a crane spreader bar, a top pick, a top handler, a transtainer and a straddle carrier the container handling means having twist locks and lugs having a lug hook section and adjacent lug recess by aligning the clasp hook section of the apparatus with the lug recess of the container handling means and placing the locking pin in contact with the upper surface of the pivoting section thereby locking the clasp element in alignment with the lug, e) a shaft having a first end and a second end having an apparatus twist lock secured thereto, and f) one or more detection means wherein in use the apparatus is releaseably secured to the container handling means by the apparatus securing means between the container handing means and a cargo container such that a cargo container can be releaseably secured to and released from the apparatus without releasing the apparatus from the container handling means by having the twist locks of the container handling means rotating the shaft and the apparatus twist lock while the clasp element is locked in alignment with the lug.

2. The apparatus of claim 1 wherein the first member comprises one detection means module, the midsection comprises one detection means module and the second member comprises one detection means module.

3. The apparatus of claim 1 further comprising detection means modules wherein the detection means are within the detection means modules.

4. The apparatus of claim 1 wherein the detection means further comprise sensors.

5. The apparatus of claim 1 wherein the detection means is selected from the group consisting of gamma spectroscopy, gamma and neutron detection, X-ray, penetrating radiation, electromagnetic radiation and combinations thereof.

6. The apparatus of claim 1 further comprising a visual and/or audible alarm that is activated when conditions for presence of weapons of mass destruction are detected.

7. The apparatus of claim 1 further comprising optical character recognition means.

8. The apparatus of claim 7 wherein the optical character recognition means are one or more digital cameras.

9. The apparatus of claim 1 further comprising a power supply.

10. The apparatus of claim 1 further comprising container aligning means.

11. The apparatus of claim 10 wherein the container aligning means comprises one or more remote activated flipper devices comprising a) a flipper with an upper arm having a first end and second end, an elbow having a first end and a second end and a lower arm having a first end, a second end and a bore hole with the upper arm adjacent at a first end to one end of the elbow with the opposite end of the elbow adjacent to one end of the lower arm, and b) a rotary actuator secured to the bore hole, the rotary actuator capable of rotating the flipper.

12. The apparatus of claim 11 wherein a rod having a first gear piece is secured to the bore hole and the rotary actuator is secured to a second gear piece that mates with and is in communication with the first gear piece such that the rotary actuator rotates the second gear piece, the second gear piece rotates the first gear piece and the first gear piece rotates the flipper.

13. The apparatus of claim 11 wherein the remote activated flipper device further comprises a) an extended piece with a second bore hole adjacent to the lower arm at the end opposite to the elbow and the rotary actuator secured to the second bore hole, b) one or more guide elements secured to the flipper about adjacent to the end of the lower arm opposite the elbow, and c) a guide trough having a horizontal piece with first and second ends, a vertical piece with first and second ends and a curved piece between an end of the horizontal piece and an end of the vertical piece wherein the guide elements are within the guide trough and the actuator is capable of moving the flipper from a position aligned with the horizontal piece of the guide trough to a position aligned with the vertical piece of the guide trough.

14. A method for detecting weapons of mass destruction comprising the steps of releaseably securing an apparatus having one or more detection means between a container handling means and a cargo container, activating the detection means and compiling data from the detection means wherein the apparatus comprises a) a first member having a first member distal leg with at least two ends, a first member forward leg with at least two ends and a first member joining section about perpendicular to and adjacent to a first end of the first member distal leg and a first end of the first member forward leg, b) a second member having a second member distal leg with at least two ends, a second member forward leg with at least two ends and a second member joining section about perpendicular to and adjacent to a first end of the second member distal leg and a first end of the second member forward leg, c) a midsection having a distal piece with an inner wall defining a distal section sleeve, an outer wall, a first end and a second end and a forward piece with an inner wall defining a forward section sleeve, an outer wall, a first end and a second end with a first end piece adjacent to and about perpendicular to the first end of each of the distal piece and the forward piece and a second end piece adjacent to and perpendicular to a the second end of each of the first piece and the second piece wherein a second end first member distal leg is inserted into the distal section sleeve at the end of the distal piece, a second end of the second member distal leg is inserted into the distal section sleeve at the second end of the distal piece, a second end of the first member forward leg is inserted into the forward section sleeve at a first end of the forward section sleeve and a second member forward leg is inserted into the first end of the forward section sleeve wherein the first member distal leg and second member distal leg are adjustable lengthwise within the distal section sleeve and the first member forward leg and second member forward leg are adjustable lengthwise within the forward section sleeve such that the length of the apparatus is adjustable, d) one or more apparatus securing means each comprising i) latching arms each having 1) an arm element having a first end and a second end, a pivoting section on having a first end, second end, upper surface lower surface and an opening for an axle and a clasp element having a clasp recess section and adjacent thereto a clasp hook section with one end of the arm element adjacent to the clasp element and the opposite end of the arm element adjacent to an end of the pivoting section, 2) a bridging section having a first end and a second end having one end integral with or secured to the apparatus, and 3) a spring element having a first end and a second end fastened at one end to the upper surface of the pivoting section by first fastening means and at the opposite end fastened proximate to the end of the bridging section opposite to the apparatus, ii) one or more locking pins releaseably secured to the apparatus, and iii) a shaft having a first end and a second end having an apparatus twist look secured thereto wherein the apparatus securing means is capable of releaseably securing the apparatus to the container handling means selected from the group consisting of a crane spreader bar, a top pick, a top handler, a transtainer and a straddle carrier the container handling means having twist locks and lugs having a lug hook section and adjacent lug recess by aligning the clasp hook section of the apparatus with the lug recess of the container handling means and placing the locking pin in contact with the upper surface of the pivoting section thereby locking the clasp element in alignment with the lug, and e) one or more detection means wherein in use the apparatus is releaseably secured to the container handing means by the apparatus securing means between the container handing means and a cargo container such that a cargo container can be releaseably secured to and released from the apparatus without releasing the apparatus from the container handling means by having the twist locks of the container handling means rotating the shaft and the apparatus twist lock while the clasp element is locked in alignment with the lug.

15. The method of claim 14 comprising the additional step of obtaining data from optical character recognition means.

16. The method of claim 14 wherein the detection means is selected from the group consisting of gamma spectroscopy, gamma and neutron detection, X-ray, penetrating radiation, electromagnetic radiation and combinations thereof.

17. The method of claim 14 wherein the data from the detection means is incorporated into a shipping manifest for one or more containers.

18. The method of claim 14 wherein the data is transmitted to a local processing system or a central processing system.

19. The method of claim 18 wherein the local processing system or central processing system has a database having information comprising container number, carrier name, shipment reference number and stowage location.

20. The method of claim 18 wherein the data is transmitted from the central processing system to the local processing system and comprises the additional step of providing a means of communication for transmitting the data from the local processing system to the central processing system.

21. The method of claim 20 wherein the means of communication is wireless.

* * * * *